United States Patent
Chiu

(10) Patent No.: US 7,341,374 B2
(45) Date of Patent: Mar. 11, 2008

(54) TEMPERATURE MEASUREMENT CIRCUIT CALIBRATED THROUGH SHIFTING A CONVERSION REFERENCE LEVEL

(75) Inventor: Jui-Te Chiu, Hsinchu (TW)

(73) Assignee: Aimtron Technology Corp., Hsinchu (TW)

( * ) Notice: Subject to any disclaimer, the term of this patent is extended or adjusted under 35 U.S.C. 154(b) by 10 days.

(21) Appl. No.: 11/163,601

(22) Filed: Oct. 25, 2005

(65) Prior Publication Data

US 2007/0091979 A1    Apr. 26, 2007

(51) Int. Cl.
*G01K 15/00* (2006.01)
*G01K 7/00* (2006.01)

(52) U.S. Cl. ............................ 374/1; 374/178; 374/170
(58) Field of Classification Search ............... 374/1, 374/178, 170
See application file for complete search history.

(56) References Cited

U.S. PATENT DOCUMENTS

| | | | |
|---|---|---|---|
| 5,195,827 A | 3/1993 | Audy et al. | |
| 5,982,221 A | 11/1999 | Tuthill | |
| 5,990,725 A | 11/1999 | LoCascio et al. | |
| 6,097,239 A | 8/2000 | Miranda, Jr. et al. | |
| 6,169,442 B1 | 1/2001 | Meehan et al. | |
| 6,554,469 B1 | 4/2003 | Thomson et al. | |
| 6,554,470 B2 | 4/2003 | Zhang et al. | |
| 6,808,307 B1 | 10/2004 | Aslan et al. | |
| 6,957,910 B1 * | 10/2005 | Wan et al. | 374/183 |
| 6,962,436 B1 * | 11/2005 | Holloway et al. | 374/170 |
| 7,083,328 B2 * | 8/2006 | Johnson | 374/178 |
| 7,089,146 B1 * | 8/2006 | D'Aquino et al. | 702/132 |
| 7,170,275 B1 * | 1/2007 | Falik | 324/71.5 |
| 2003/0086476 A1 * | 5/2003 | Mizuta | 374/178 |
| 2006/0093016 A1 * | 5/2006 | McLeod et al. | 374/178 |
| 2006/0193370 A1 * | 8/2006 | St. Pierre et al. | 374/178 |

* cited by examiner

*Primary Examiner*—Gail Verbitsky
*Assistant Examiner*—Mirellys Jagan
(74) *Attorney, Agent, or Firm*—Winston Hsu

(57) ABSTRACT

A temperature measurement circuit has a current excitation circuit, a temperature calculation circuit, a calibration factor generator, and an analog-to-digital conversion circuit. The current excitation circuit supplies in sequence at least two currents to a thermal sensor. At least two output signals are correspondingly generated from the thermal sensor. In response to the at least two output signals, the temperature calculation circuit calculates an analog temperature signal representative of a temperature detected by the thermal sensor. The analog-to-digital conversion circuit converts the analog temperature signal into a digital signal based on a conversion reference level. The conversion reference level is shifted in accordance with a calibration value generated from the calibration factor generator.

9 Claims, 5 Drawing Sheets

TEMPERATURE MEASUREMENT CIRCUIT CALIBRATED THROUGH SHIFTING A CONVERSION REFERENCE LEVEL

BACKGROUND OF THE INVENTION

1. Field of the Invention

The present invention relates to a temperature measurement circuit and, more particularly, to a temperature measurement circuit capable of performing a calibration function through shifting a conversion reference level of an analog-to-digital conversion circuit.

2. Description of the Related Art

Because the potential difference across the semiconductor pn junction of diodes or transistors is related to the current flowing through the junction itself and further depends on the temperature of the junction, this kind of semiconductor pn junction is widely employed in the integrated circuits to perform the task of temperature measurement. FIG. 1 is a schematic diagram showing a circuit configuration of a conventional temperature measurement circuit 10. Typically, the temperature measurement circuit 10 is installed to monitor a temperature of an external system 20. The external system 20 may, for example, refer to a computer, an electronic device, or a certain circuitry region, which has a thermal sensor 21 built inside to provide a semiconductor pn junction for trying to detect the temperature of the external system 20. As shown in the figure, the thermal sensor 21 may be implemented by a pnp bipolar transistor that provides the semiconductor pn junction between the base and emitter electrodes.

In the temperature measurement circuit 10, two switches $S_1$ and $S_2$ of a current source circuit 11 are turned ON and OFF by a control circuit 12 to therefore allow different currents $I_1$ and $I_2$ to be applied to the thermal sensor 21, respectively. Assumed that the current $I_1$ is applied to the thermal sensor 21 to cause a potential difference $V_{BE1}$ across the base and emitter electrodes and the current $I_2$ is applied to the thermal sensor 21 to cause a potential difference $V_{BE2}$ across the base and emitter electrodes, a temperature calculation circuit 13 subtracts $V_{BE2}$ from $V_{BE1}$ and then generates a difference $\Delta V_{BE}$ expressed in the following equation (1):

$$\Delta V_{BE} = V_{BE1} - V_{BE2} = \frac{KT}{q}\ln\left(\frac{I_1}{I_2}\right) + (I_1 - I_2)\left(R_e + \frac{R_b}{\beta}\right) \quad (1)$$

wherein K is Boltzmann's constant, T is the absolute temperature, q is the electron charge, $R_e$ is the series parasitic resistance of the base electrode, $R_b$ is the series parasitic resistance of the emitter electrode, and $\beta$ is the gain of the transistor. As a result, the potential difference $\Delta V_{BE}$ generated by the temperature calculation circuit 13 is an analog signal that changes along with the temperature and therefore provides the information about the temperature. Afterwards, an analog-to-digital conversion circuit (ADC) 14 converts such analog signal into a digital temperature signal.

As seen in equation (1), the series parasitic resistances $R_e$ and $R_b$ of the thermal sensor 21 causes a constant-term offset, $(I_1-I_2)(R_e+R_b/\beta)$, which is independent of the temperature. Hoping to get an accurate result on the temperature measurement, the prior art employs three or more different currents to sequentially excite the same thermal sensor 21 in order to eliminate the constant-term offset caused by such series parasitic resistances $R_e$ and $R_b$. However, the prior art three or more current excitation method not only requires a much higher frequency in operation but also causes some disadvantages like power inefficiency and temperature fluctuation. Even if the operational frequency is intentionally kept constant, the excitations by more and more currents will inevitably make each cycle of temperature measurement much longer and therefore reduce the speed of response, to the temperature variation, of the temperature measurement circuit 10.

On the other hand, what the temperature measurement circuit 10 actually monitors is the temperature of the semiconductor substrate on which the thermal sensor 21 is formed, and such actually monitored temperature may not necessary be equal to the real representative temperature of the external system 20. Especially in the case where the external system 20 is a computer, the temperature of interest would usually be the temperature of a thermal sinking plate 22 attached in the external system 20 instead of the temperature of the semiconductor substrate on which the thermal sensor 21 is formed. As for such case, the manufacturer of the external system 20 provides a temperature offset data $\Delta T$, which indicates a temperature difference existing between the thermal sinking plate 22 and the substrate of the thermal sensor 21, to be stored in a register 15 of the temperature measurement circuit 10. Afterwards, the digital output of the analog-to-digital conversion circuit 14 are calibrated in accordance with the temperature offset data $\Delta T$ through an adder 16 so as to eventually generate an accurate temperature signal Tmp.

SUMMARY OF THE INVENTION

In view of the above-mentioned problems, an object of the present invention is to provide a temperature measurement circuit capable of performing a calibration function through shifting a conversion reference level of an analog-to-digital conversion circuit.

According to one aspect of the present invention, a temperature measurement circuit includes a current excitation circuit, a calculation circuit, a calibration factor generator, and an analog-to-digital conversion circuit. The current excitation circuit sequentially applies at least two currents to a thermal sensor. At least two output signals are correspondingly generated from the thermal sensor. In response to the at least two output signals, the calculation circuit calculates an analog temperature signal representative of a temperature detected by the thermal sensor. The calibration factor generator generates a calibration factor. The analog-to-digital conversion circuit converts the analog temperature signal into a digital temperature signal in accordance with a reference level for conversion. The reference level for conversion is shifted in accordance with the calibration factor.

The thermal sensor has a semiconductor pn junction such that the at least two currents sequentially flows through the semiconductor pn junction to generate at least two potential differences across the semiconductor pn junction for serving as the at least two output signals. The calibration factor is calculated when the current excitation circuit sequentially applies at least three currents to the thermal sensor, and is used for calibrating a constant-term offset of the analog temperature signal. The thermal sensor is formed in a substrate of an external system. The calibration factor is provided by the external system to calibrate a temperature offset between the temperature detected by the thermal sensor and a representative temperature of the external system.

According to another aspect of the present invention, a method of measuring a temperature is provided. The first step is sequentially applying at least two currents to a thermal sensor. At least two output signals are correspondingly generated from the thermal sensor. The second step is calculating an analog temperature signal in response to the at least two output signals. The analog temperature signal is representative of a temperature detected by the thermal sensor. The third step is generating a calibration factor. The fourth step is converting the analog temperature signal into a digital temperature signal in accordance with a reference level for conversion. The reference level for conversion is shifted in accordance with the calibration factor.

According to still another aspect of the present invention, a current excitation circuit for exciting a thermal sensor includes a measurement current source circuit, a calibration current source circuit, a calibration control circuit, and a measurement control circuit. The measurement current source circuit provides a first measurement current and a second measurement current. The calibration current source circuit provides a calibration current. The calibration control circuit allows the first measurement current, the second measurement current, and the calibration current to be sequentially applied to the thermal sensor, thereby determining a constant-term offset associated with the thermal sensor. The measurement control circuit allows the first measurement current and the second measurement current to be sequentially applied to the thermal sensor, thereby measuring a temperature of the thermal sensor. The calibration control circuit is activated earlier than the measurement control circuit in order to determine the constant-term offset before the temperature of the thermal sensor is measured.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 1:
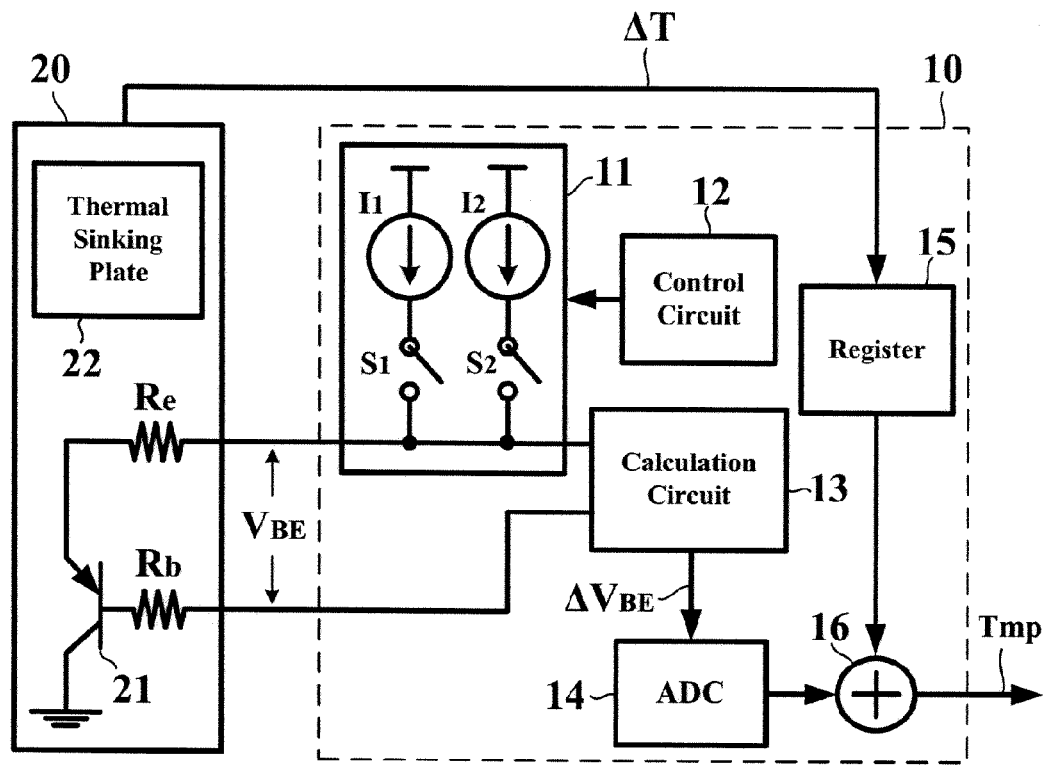
FIG. 1 is a schematic diagram showing a circuit configuration of a conventional temperature measurement circuit.
Figure 2:
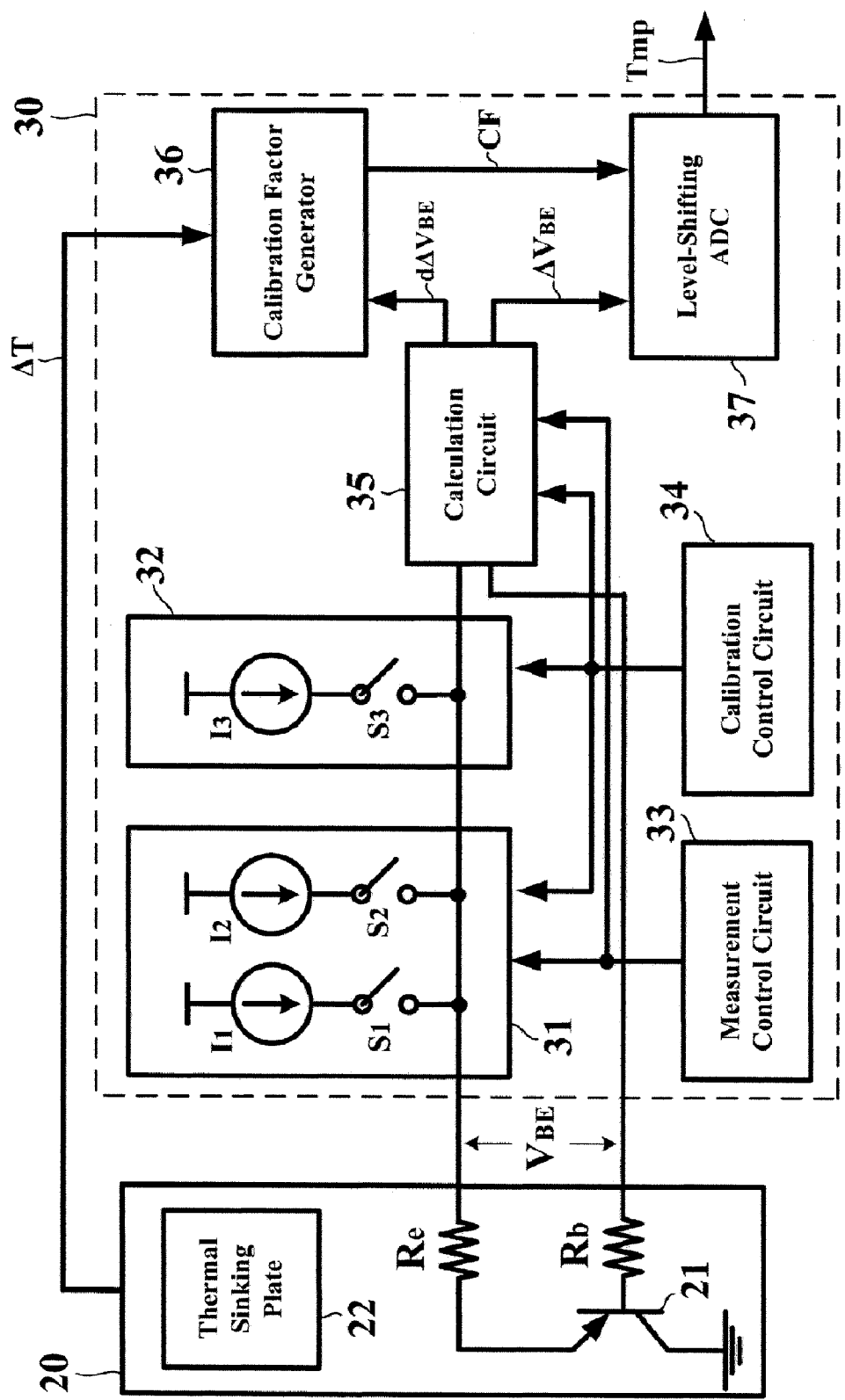
FIG. 2 is a schematic diagram showing a circuit configuration of a temperature measurement circuit according to the present invention.

FIG. 2 is a schematic diagram showing a circuit configuration of a temperature measurement circuit 30 according to the present invention. In the temperature measurement circuit 30, a measurement current source circuit 31, a calibration current source circuit 32, a measurement control circuit 33, and a calibration control circuit 34 all come together to form a current excitation circuit. The measurement current source circuit 31 provides a first measurement current $I_1$ and a second measurement current $I_2$ to the emitter electrode of the thermal sensor 21 respectively through two switches $S_1$ and $S_2$. The calibration current source circuit 32 provides a calibration current 13 to the emitter electrode of the thermal sensor 21 through a switches $S_3$. Before the temperature measurement circuit 30 is ready to start measuring the temperature of the thermal sensor 21, the calibration control circuit 34 must be activated to determine a constant-term offset associated with the series parasitic resistances $R_e$ and $R_b$ by controlling and applying the first and second measurement currents $I_1$ and $I_2$ and the calibration current $I_3$ in sequence to the thermal sensor 21. Assumed that the currents $I_1$, $I_2$, and $I_3$ are applied to the thermal sensor 21 to cause three potential differences $V_{BE1}$, $V_{BE2}$, and $V_{BE3}$ across the base and emitter electrodes, respectively, a calculation circuit 35 generates an equation (2) as expressed in the following:

$$\Delta V_{BE1} = V_{BE1} - V_{BE2} = \frac{KT}{q}\ln\left(\frac{I_1}{I_2}\right) + (I_1 - I_2)\left(R_e + \frac{R_b}{\beta}\right) \quad (2)$$

$$\Delta V_{BE2} = V_{BE2} - V_{BE3} = \frac{KT}{q}\ln\left(\frac{I_2}{I_3}\right) + (I_2 - I_3)\left(R_e + \frac{R_b}{\beta}\right)$$

$$d\Delta V_{BE} =$$

$$\Delta V_{BE1} - \Delta V_{BE2} = \frac{KT}{q}\ln\left(\frac{I_1 * I_3}{I_2 * I_2}\right) + (I_1 - 2I_2 - I_3)\left(R_e + \frac{R_b}{\beta}\right)$$

Assumed again that the currents $I_1$, $I_2$, and $I_3$ satisfy a proportional condition (3) as follows:

$$I_1:I_2:I_3=A^2:A:1 \quad (3)$$

That is, when the first measurement current $I_1$ is set equal to A times the second measurement current $I_2$, and the second measurement current $I_2$ is set equal to A times the calibration current $I_3$, where A is larger than zero, the equation (2) may further be reduced to the following equation (4):

$$d\Delta V_{BE} = (A-1)^2 * I_3 * \left(R_e + \frac{R_b}{\beta}\right) \quad (4)$$

Therefore, with the help of the calibration current $I_3$, the calculation circuit 35 effectively determines a constant-term offset $d\Delta V_{BE}$ associated with the series parasitic resistances $R_e$ and $R_b$. Afterwards, such constant-term offset $d\Delta V_{BE}$ is delivered to a calibration factor generator 36 for generating a calibration factor CF that is determined before any temperature measurement cycle is actually performed.

Figure 3A:
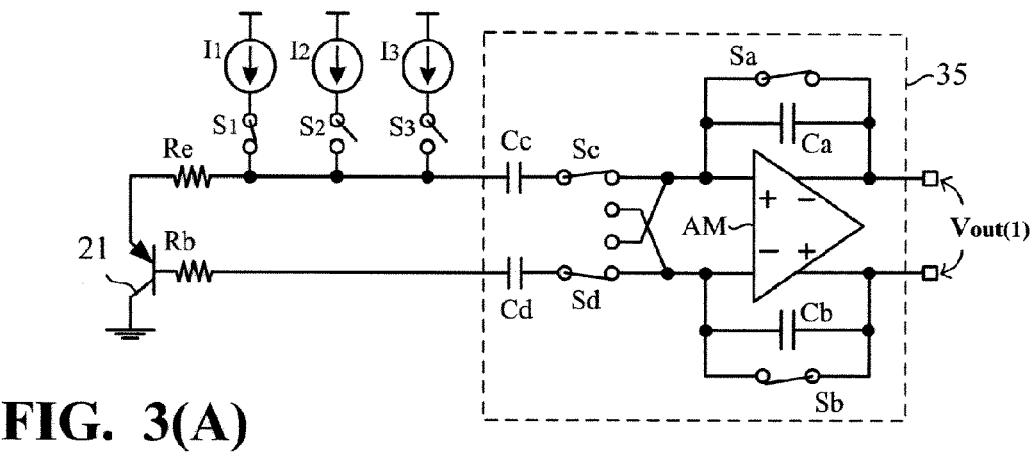
FIGS. 3(A) to 3(C) are configuration diagrams showing an operation of the temperature measurement circuit according to the present invention.
Figure 3B:
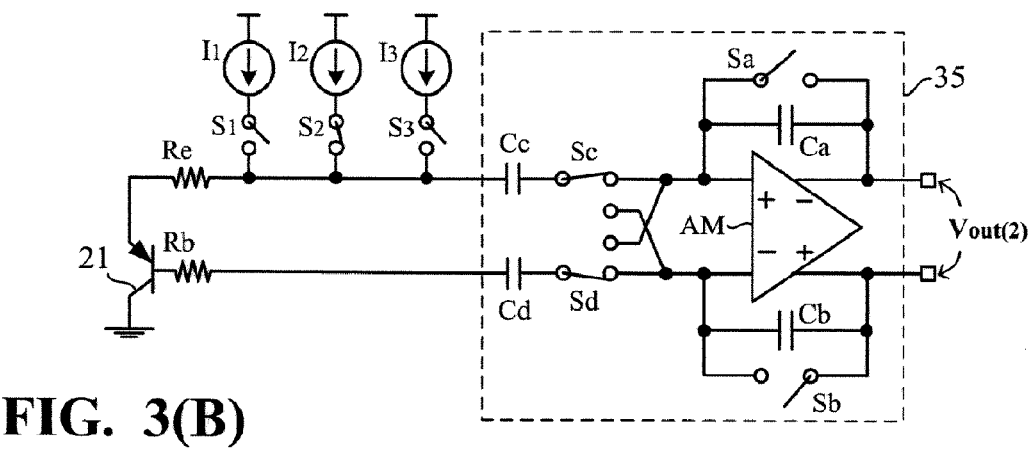
Figure 3C:
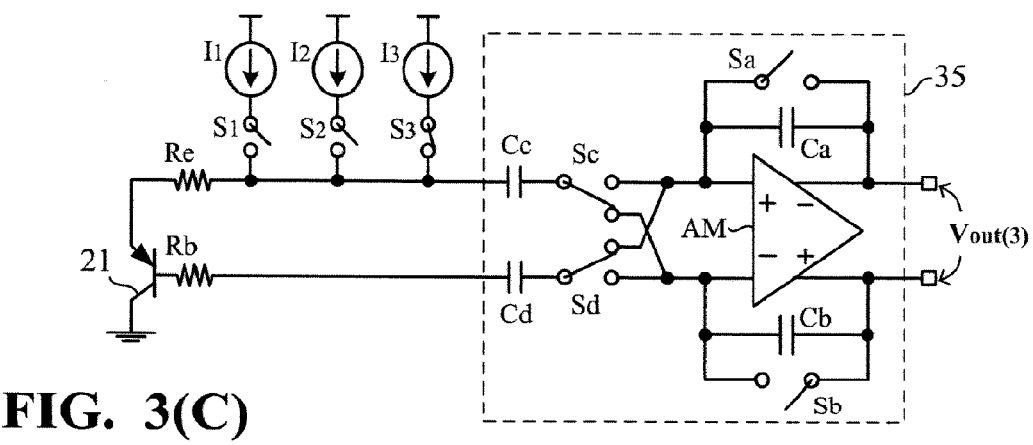

FIGS. 3(A) to 3(C) are configuration diagrams showing an operation of the calculation circuit 35 when determining a constant-term offset $d\Delta V_{BE}$ in according to the present invention. In FIG. 3(A), the switch $S_a$ is turned ON, the switch $S_b$ is turned ON, the switch $S_c$ couples the capacitor $C_c$ to the non-inverting input terminal (+) of the differential amplifier AM, and the switch $S_d$ couples the capacitor $C_d$ to the inverting input terminal (−) of the differential amplifier AM. Moreover, the switch $S_1$ is turned ON and the switches $S_2$ and $S_3$ are both turned OFF for allowing only the first measurement current $I_1$ to be applied to the thermal sensor 21 and generate a first potential difference $V_{BE1}$ across the base and emitter electrodes. During such first phase, the output voltage $V_{out(1)}$ of the differential amplifier AM is zero because the non-inverting (+) and inverting (−) input terminals of the differential amplifier AM are both at a voltage of zero. In FIG. 3(B), the switches $S_a$ and $S_b$ are both turned OFF. Moreover, the switch $S_2$ is turned ON and the switches $S_1$ and $S_3$ are both turned OFF for allowing only the second measurement current $I_2$ to be applied to the thermal sensor 21 and generate the second potential difference $V_{BE2}$ across the base and emitter electrodes. During such second phase, the output voltage $V_{out(2)}$ of the differential amplifier AM is $(V_{BE1}-V_{BE2})$ because the non-inverting (+) and inverting (−) input terminals of the differential amplifier AM are both at a voltage of $(V_{BE1}-V_{BE2})/2$. In FIG. 3(C), the switch $S_c$ couples the capacitor $C_c$ to the inverting input terminal (−) of the differential amplifier AM while the switch $S_d$ couples the capacitor $C_d$ to the non-inverting input terminal (+) of the differential amplifier AM. Moreover, the switch $S_3$ is turned ON and the switches $S_1$ and $S_2$ are both turned OFF for allowing only the calibration current $I_3$ to be applied to the thermal sensor 21 and generate the third potential difference $V_{BE3}$ across the base and emitter electrodes. During such third phase, the output voltage $V_{out(3)}$ of the differential amplifier AM becomes $(V_{BE1}-V_{BE2})-(V_{BE2}-V_{BE3})$, which is just the constant-term offset $d\Delta V_{BE}$ expressed in the equations (2) and (4).

It should be noted that in the present invention the calibration current source circuit 32 and the calibration control circuit 34 are disabled for any further operation after the constant-term offset $d\Delta V_{BE}$ has been determined and output to the calibration factor generator 36. In other words, when actually measuring the temperature of the thermal sensor 21, the temperature measurement circuit 30 employs only the measurement control circuit 33 to control the measurement current source circuit 31 such that the first and second measurement currents $I_1$ and $I_2$ are applied in sequence to the thermal sensor 21. Therefore, the calculation circuit 35 during each temperature measurement cycle is restricted to alternately operate only between the first and second phases shown in FIGS. 3(A) and 3(B). Under the assumption that the proportional condition (3) is satisfied and the constant-term offset $d\Delta V_{BE}$ of the equation (4) has been determined, the potential difference $\Delta V_{BE}$ across the base and emitter electrodes generated from the calculation circuit 35 may be expressed as follows:

$$\Delta V_{BE} = V_{BE1} - V_{BE2} = \frac{KT}{q}\ln(A) + \left(\frac{A}{A-1}\right)d\Delta V_{BE} \quad (5)$$

Therefore in the present invention an accurate temperature measurement result is effectively obtained by level-shifting the potential difference $\Delta V_{BE}$, which is measured only through the first and second measurement currents $I_1$ and $I_2$, with the predetermined constant-term offset $d\Delta V_{BE}$ multiplied by a factor of $A/(A-1)$. Since the constant-term offset $d\Delta V_{BE}$ has been determined at the beginning through the help of the calibration current 13 and stored in the calibration factor generator 36, it is possible to reduce the number of the necessary excitation currents down to only two during each temperature measurement cycle.

Figure 4:
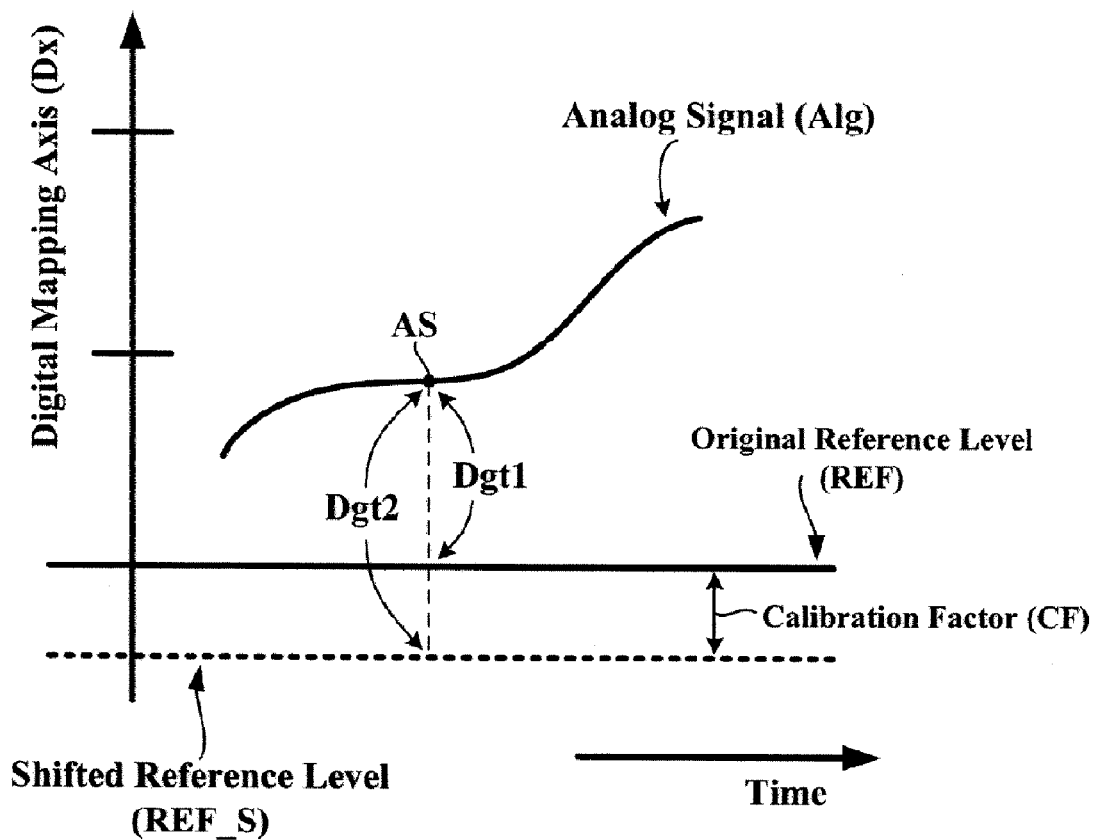
FIG. 4 is a conceptual diagram showing a level-shifting principle employed in an analog-to-digital conversion circuit according to the present invention.

In addition to the constant-term offset $d\Delta V_{BE}$, the calibration factor generator 36 also receives from the external system 20 the temperature offset data $\Delta T$ between the thermal sensor 21 and the thermal sinking plate 22. Since the constant-term offset $d\Delta V_{BE}$ and the temperature offset data $\Delta T$ both belong to this type of error that can be corrected by level-shifting, the calibration factor generator 36 may integrate them into a compound calibration factor CF. On the basis of the calibration factor CF, a level-shifting analog-to-digital conversion circuit (ADC) 37 determines an appropriate reference level REF for conversion. FIG. 4 is a conceptual diagram showing a level-shifting principle employed in an analog-to-digital conversion circuit 37 according to the present invention. Generally speaking, the analog-to-digital conversion circuit 37 samples the received analog signal Alg in accordance with a predetermined frequency. Afterwards, the analog sample result is converted into a digital signal. Viewing in terms of mathematics, this conversion process may be considered as done through a digital mapping axis Dx and therefore the actual digital value after converted depends on the relative position of the conversion reference level REF. For example, as shown in FIG. 4, the original reference level REF for conversion is shifted downward by the calibration factor CF so as to become a shifted reference level REF_S for conversion. With respect to the original reference level REF for conversion, the analog sample AS is converted to a first digital signal Dgt1. However, with respect to the shifted reference level REF_S for conversion, the analog sample AS is converted to the second digital signal Dgt2. Therefore, through shifting the reference level REF for conversion instead of performing the prior art adding process for calibration, the level-shifting analog-to-digital conversion circuit 37 effectively eliminates the constant-term offset $d\Delta V_{BE}$ and the temperature offset data $\Delta T$ from the temperature measurement result.

Figure 5:
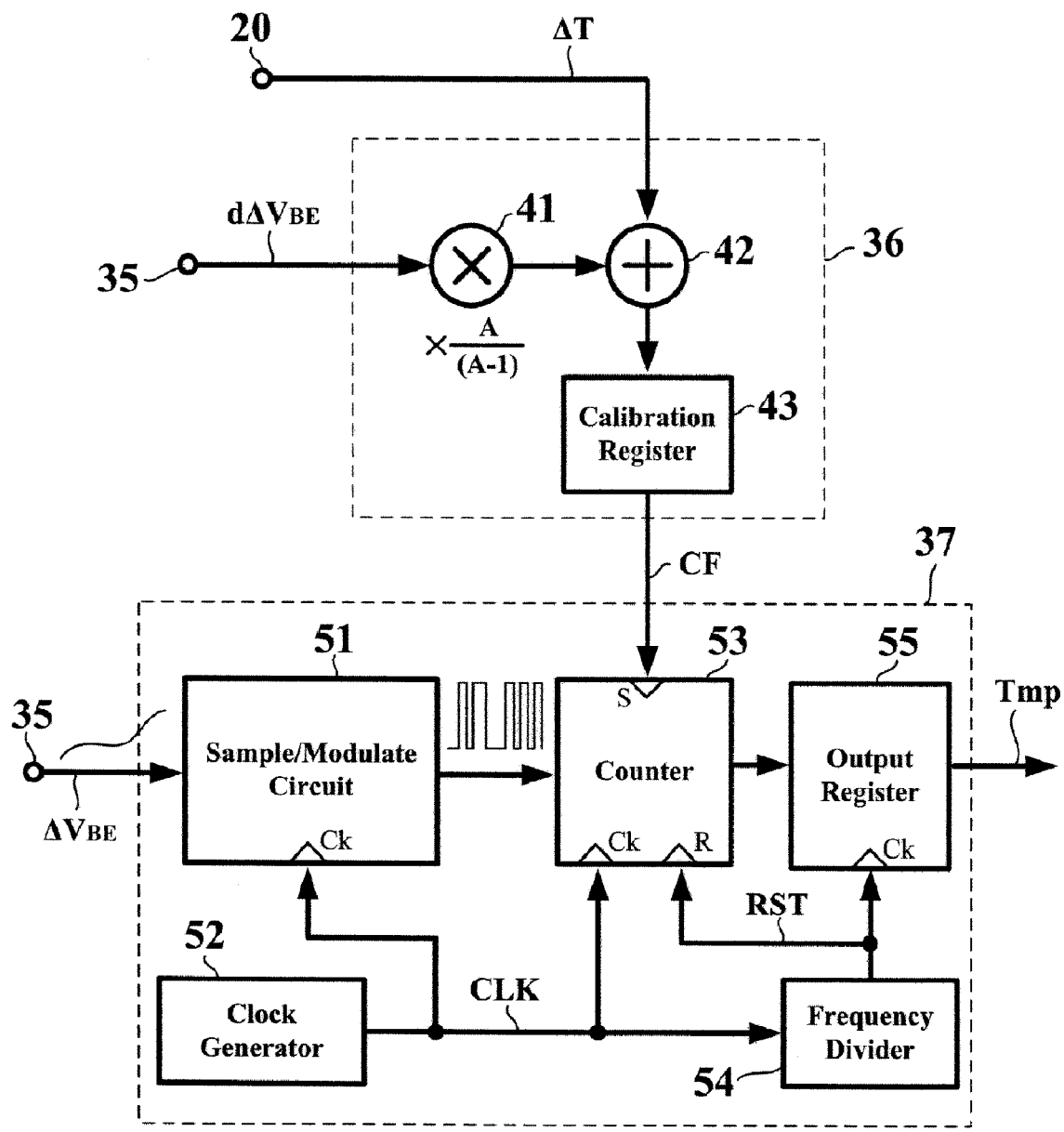
FIG. 5 is a detailed circuit diagram showing an example of an analog-to-digital conversion circuit according to the present invention.

FIG. 5 is a detailed circuit diagram showing an example of an analog-to-digital conversion circuit 37 according to the present invention. A sample/modulate circuit 51 is used for sampling the potential difference $\Delta V_{BE}$ from the calculation circuit 35 in accordance with a clock signal CLK provided by a clock generator 52, and for modulating the sample result into a pulse train signal. For example, the sample/modulate circuit 51 may be implemented by a Delta-Sigma analog-to-digital modulator such that the pulse train signal is a digital version of the analog sample. The pulse train from the sample/modulate circuit 51 is applied to a counter 53. Within a predetermined period of time, the counter 53 counts the number of the pulses in the pulse train signal. Because the counting step performed in the counter 53 increments the counting result from a ground value, shifting the ground value has the same effect as changing the counting result of the counter 53, which is therefore applied by the present inventor to the calibration for the temperature measurement result Tmp.

More specifically, the ground value of the counter 53 is determined by the calibration factor CF provided from the calibration factor generator 36. In the calibration factor generator 36, the constant-term offset $d\Delta V_{BE}$ from the calculation circuit 53 is multiplied by $A/(A-1)$ through a multiplier 41 and then added with the temperature offset data $\Delta T$ from the external system 20 through an adder 42, thereby generating a compound calibration factor CF to be stored in a calibration register 43. In other words, the embodiment shown in FIG. 5 carries out the principle of shifting the reference level REF for calibration shown in FIG. 4 through shifting the ground value of the counter 53. On the other hand, a frequency divider 54 generates a reset signal RST with a lower frequency by dividing the frequency of the clock signal CLK of the clock generator 52. In one embodiment, the frequency divider 54 divides the frequency of the clock signal CLK by 1024 in order to generate the reset signal RST. As a result, every 1024 periods of the clock signal CLK the counter 53 is reset to the ground value for a new cycle of counting. As always, the ground value is determined by the calibration factor CF provide by the calibration factor generator 36. Furthermore, the counter 53 outputs the counting result to the register 55 every 1024 periods of the clock signal CLK. The temperature measurement result Tmp is refreshed in accordance with the frequency of the reset signal RST.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A temperature measurement circuit comprising:
    a current excitation circuit for sequentially applying at least two currents to a thermal sensor, from which at least two output signals are correspondingly generated;
    a calculation circuit for, in response to the at least two output signals, calculating an analog temperature signal representative of a temperature detected by the thermal sensor;
    a calibration factor generator for generating a calibration factor, wherein the calibration factor is calculated when the current excitation circuit sequentially applies at least three currents to the thermal sensor, and is used for calibrating a constant-term offset of the analog temperature signal, wherein the constant-term offset is caused by at least one series parasitic resistance of the thermal sensor; and
    an analog-to-digital conversion circuit for converting the analog temperature signal into a digital temperature signal in accordance with a reference level for conversion,
    wherein the reference level for conversion is shifted in accordance with the calibration factor.

2. The circuit according to claim 1, wherein:
    the thermal sensor has a semiconductor pn junction such that the at least two currents sequentially flows through the semiconductor pn junction to generate at least two potential differences across the semiconductor pn junction for serving as the at least two output signals.

3. The circuit according to claim 1, wherein:
    the thermal sensor is formed in a substrate separate from the temperature measurement circuit, and
    the calibration factor is provided to calibrate a temperature offset between the temperature detected by the thermal sensor and a representative temperature of the substrate.

4. The circuit according to claim 1, wherein:
    the analog-to-digital conversion circuit includes:
        a sample/modulate circuit for generating a pulse train signal in response to the analog temperature signal, and
        a counter for generating a counting result each predetermined period in response to the pulse train signal, the counting result being indicative of a number of pulses of the pulse train signal,
        wherein the counting result increments from a ground value determined by the calibration factor.

5. The circuit according to claim 1, wherein:
    the current excitation current includes:
        a measurement current source circuit for providing a first measurement current and a second measurement current;
        a calibration current source circuit for providing a calibration current;
        a calibration control circuit for allowing the first measurement current, the second measurement current, and the calibration current to be sequentially applied to the thermal sensor; and
        a measurement control circuit for allowing the first measurement current and the second measurement current to be sequentially applied to the thermal sensor,
    wherein the calibration control circuit is activated earlier than the measurement control circuit in order to calculate a constant-term offset for serving as part or all of the calibration factor.

6. The circuit according to claim 5, wherein:
    the first measurement current is A times the second measurement current, and
    the second measurement current is A times the calibration current, where A is larger than zero.

7. A method of measuring a temperature comprising:
    sequentially applying at least two currents to a thermal sensor, from which at least two output signals are correspondingly generated;
    calculating an analog temperature signal in response to the at least two output signals, the analog temperature signal being representative of a temperature detected by the thermal sensor;
    generating a calibration factor, wherein the calibration factor is calculated through sequentially applying at least three currents to the thermal sensor, and is used for calibrating a constant-term offset of the analog temperature signal, wherein the constant-term offset is caused by at least one series parasitic resistance of the thermal sensor; and
    converting the analog temperature signal into a digital temperature signal in accordance with a reference level for conversion,
    wherein the reference level for conversion is shifted in accordance with the calibration factor.

8. The method according to claim 7, wherein:
    the thermal sensor has a semiconductor pn junction such that the at least two currents sequentially flows through the semiconductor pn junction to generate at least two potential differences across the semiconductor pn junction for serving as the at least two output signals.

9. The method according to claim 7, wherein:
    the thermal sensor is formed in a substrate, and
    the calibration factor is provided to calibrate a temperature offset between the temperature detected by the thermal sensor and a representative temperature of the substrate.

* * * * *